United States Patent
Inoue et al.

(10) Patent No.: US 9,437,185 B2
(45) Date of Patent: Sep. 6, 2016

(54) ACTIVE SOUND EFFECT GENERATING APPARATUS

(71) Applicant: HONDA MOTOR CO., LTD., Tokyo (JP)

(72) Inventors: Toshio Inoue, Wako (JP); Tomoki Ogita, Wako (JP); Takuma Maesaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/719,574

(22) Filed: May 22, 2015

(65) Prior Publication Data
US 2015/0353007 A1 Dec. 10, 2015

(30) Foreign Application Priority Data

Jun. 4, 2014 (JP) .................................. 2014-115884

(51) Int. Cl.
*H03G 3/00* (2006.01)
*G10K 15/02* (2006.01)
*B60Q 5/00* (2006.01)

(52) U.S. Cl.
CPC ................ *G10K 15/02* (2013.01); *B60Q 5/00* (2013.01); *Y10S 903/902* (2013.01)

(58) Field of Classification Search
CPC ....................................................... B60Q 5/00
USPC .......................................................... 381/61
See application file for complete search history.

(56) References Cited

U.S. PATENT DOCUMENTS

| | | | |
|---|---|---|---|
| 5,848,168 A * | 12/1998 | Shipps | F01N 1/065 381/71.5 |
| 8,045,723 B2 | 10/2011 | Kobayashi et al. | |
| 2004/0240677 A1 * | 12/2004 | Onishi | G10K 11/1784 381/71.4 |
| 2004/0247137 A1 | 12/2004 | Inoue et al. | |
| 2006/0215846 A1 | 9/2006 | Kobayashi et al. | |
| 2008/0313642 A1 * | 12/2008 | Karaoguz | G06F 9/5027 718/104 |
| 2009/0028353 A1 | 1/2009 | Kobayashi et al. | |
| 2012/0101611 A1 * | 4/2012 | Inoue | G10K 15/02 700/94 |
| 2013/0216054 A1 | 8/2013 | Inoue | |

FOREIGN PATENT DOCUMENTS

| | | |
|---|---|---|
| JP | 2004-361721 A | 12/2004 |
| JP | 2006-301598 A | 11/2006 |
| JP | 2009-31428 A | 2/2009 |
| JP | 2012-131315 A | 7/2012 |
| JP | 2013-167851 A | 8/2013 |

* cited by examiner

*Primary Examiner* — Simon Sing
(74) *Attorney, Agent, or Firm* — Westerman, Hattori, Daniels & Adrian, LLP (57) ABSTRACT

A control signal generating unit in an active sound effect generating apparatus adjusts the amplitude of a control signal by varying the amplitudes of reference signals in accordance with an amount of change in frequency and a load of a driving source.

18 Claims, 7 Drawing Sheets

ACTIVE SOUND EFFECT GENERATING APPARATUS

CROSS REFERENCES TO RELATED APPLICATIONS

The present application claims priority under 35 U.S.C. §119 to Japanese Patent Application No. 2014-115884, filed Jun. 4, 2014, entitled "Active sound effect generating apparatus." The contents of this application are incorporated herein by reference in their entirety.

TECHNICAL FIELD

The present disclosure relates to an active sound effect generating apparatus that generates a sound effect in accordance with the running state of a vehicle.

BACKGROUND

There is proposed an active sound effect generating apparatus (hereinafter also referred to as an "active sound control apparatus (ASC apparatus)") which detects an acceleration-deceleration operation by a driver and generates in a vehicle interior via an in-vehicle speaker a sound effect in accordance with the amount of acceleration-deceleration (for example, refer to Japanese Unexamined Patent Application Publication No. 2009-031428 and Japanese Unexamined Patent Application Publication No. 2013-167851).

In Japanese Unexamined Patent Application Publication No. 2009-031428, the amplitude of a control signal Sc is set by adjusting the amplitudes of reference signals Sr1, Sr2, and Sr3 in accordance with an amount of change in rotational frequency Δaf [Hz/sec], which is a time differential value of an engine rotational frequency fe [Hz], and an accelerator opening degree Aor [%] (summary).

In Japanese Unexamined Patent Application Publication No. 2013-167851, a first gain GΔaf based on the amount of change in rotational frequency Δaf, which is the time differential value of the engine rotational frequency fe, and a shift position Ps is set (FIG. 1 and paragraph [0038]). In addition, a second gain Gfe based on the engine rotational frequency fe is set (paragraph [0039]). Furthermore, a third gain Gap based on an accelerator opening degree θap is set (paragraph [0040]). The product of the second gain Gfe and the third gain Gap is calculated and the calculated product is added to the first gain GΔaf to calculate a fourth gain Gcom (paragraphs [0044] and [0045]). A control signal Sc2 (an amplitude adjustment control signal) is generated using the fourth gain Gcom (paragraph [0046]).

Vehicles that use continuously variable transmissions (CVTs) as transmissions and electric vehicles (for example, hybrid vehicles and strict battery-powered vehicles) that use motors as driving sources have been in widespread use in recent years.

In the case of a typical vehicle including a CVT, the variation in the engine rotational frequency may not follow the operation of an accelerator pedal on a road, such as a slope, even if the accelerator pedal is depressed by the driver. For example, when the accelerator pedal is suddenly depressed, a situation may occur in which the shift transmission by the CVT does not follow the operation of the accelerator pedal, the engine rotational frequency is increased first, and the vehicle speed is not immediately increased.

In such a case, the vehicle speed may not follow the amount of change in rotational frequency or the amount of change in the accelerator opening degree in the configuration in which the amplitude of the sound effect is adjusted in accordance with the amount of change in rotational frequency and the accelerator opening degree, as in Japanese Unexamined Patent Application Publication No. 2009-031428 and Japanese Unexamined Patent Application Publication No. 2013-167851, thereby causing the driver to be concerned.

In electric vehicles, an engine is not as a driving source. In hybrid vehicles, there are cases in which the engine is stopped and the vehicle runs using only a motor. In the vehicles described above which do not use an engine at all or use an engine only temporarily as a driving source, it is difficult to apply the technologies in Japanese Unexamined Patent Application Publication No. 2009-031428 and Japanese Unexamined Patent Application Publication No. 2013-167851 in which the engine rotational frequency and the amount of change in rotational frequency, which is the time differential value of the engine rotational frequency, are used.

It is also desirable to resolve the above problems in the vehicles that use an engine without provided with the CVT considering common usage of the ASC apparatuses among several types of vehicles.

SUMMARY

It is desirable to provide an ASC apparatus capable of achieving at least one of generation of a more natural sounding sound effect and application to an electric vehicle.

One aspect of the present application describes an active sound effect generating apparatus including a waveform data table that stores pieces of waveform data corresponding to one waveform period; a vehicle speed detecting unit that detects a vehicle speed; a frequency setting unit that sets a vehicle speed corresponding frequency, which is defined on the basis of the vehicle speed detected by the vehicle speed detecting unit; a reference signal generating unit that generates a reference signal having a harmonic based on the vehicle speed corresponding frequency by sequentially reading the pieces of waveform data from the waveform data table; a control signal generating unit that generates a control signal used for generation of a sound effect on the basis of the reference signal; an output unit that outputs the control signal as the sound effect; an amount-of-change-in-frequency calculating unit that calculates an amount of change in frequency, which is a time differential value of the vehicle speed corresponding frequency; and a driving source load detecting unit that detects a load of a driving source of a vehicle. The control signal generating unit adjusts the amplitude of the control signal by varying the amplitude of the reference signal in accordance with the amount of change in frequency and the load of the driving source.

Thus, the vehicle speed corresponding frequency defined on the basis of the vehicle speed is set to calculate the amount of change in frequency, which is a time differential value of the vehicle speed corresponding frequency. The amplitude of the control signal is adjusted by varying the amplitude of the reference signal in accordance with the amount of change in frequency and the load of the driving source. Accordingly, for example, even if the increase in the vehicle speed is delayed from the increase in the engine rotational frequency when the accelerator pedal is suddenly depressed, the sound effect is generated in accordance with the amount of change in frequency based on the vehicle speed and the load of the driving source, in addition to or instead of the engine rotational frequency. This allows the sound effect more appropriate for the behavior of the vehicle to be produced.

In addition, it is possible to produce the sound effect appropriate for the behavior of the vehicle even when the vehicle is an electric vehicle that is not provided with an engine serving as the driving source.

A frequency, which is a fundamental frequency, may be set in advance in accordance with the vehicle speed in the frequency setting unit. In this case, it is possible to represent a dominant portion in the sound effect at the fundamental frequency corresponding to the vehicle speed. Accordingly, it is possible to generate the more natural sound effect for the driver.

When the vehicle is a hybrid vehicle including an engine and a motor as the driving sources, the active sound effect generating apparatus may further include a rotational frequency detecting unit that detects a rotational frequency of the engine; and an amount-of-change-in-rotational frequency calculating unit that calculates an amount of change in rotational frequency, which is a time differential value of the rotational frequency. The driving source load detecting unit may detect a load of the engine. The reference signal generating unit may generate the reference signal on the basis of the rotational frequency of the engine when only the engine is in a driving state and the reference signal generating unit may generate the reference signal on the basis of an arbitration frequency resulting from arbitration or selection of the vehicle speed corresponding frequency and the rotational frequency of the engine when both the engine and the motor are in the driving state. With the above configuration, it is possible to appropriately output the sound effect even if the operation state of the driving source is varied in the hybrid vehicle.

Another aspect of the present application describes an active sound effect generating apparatus including a waveform data table that stores pieces of waveform data corresponding to one waveform period; a rotational frequency detecting unit that detects a rotational frequency of an engine; a reference signal generating unit that generates a reference signal having a harmonic based on the rotational frequency by sequentially reading the pieces of waveform data from the waveform data table; a control signal generating unit that generates a control signal used for generation of a sound effect on the basis of the reference signal; an output unit that outputs the control signal as the sound effect; an amount-of-change-in-rotational-frequency calculating unit that calculates an amount of change in rotational frequency, which is a time differential value of the rotational frequency; an engine load detecting unit that detects a load of the engine; and a vehicle speed detecting unit that detects a vehicle speed. The control signal generating unit adjusts the amplitude of the control signal by varying the amplitude of the reference signal in accordance with the amount of change in rotational frequency, the load of the engine, and the vehicle speed. The amplitude of the control signal is set so as to be decreased with the decreasing vehicle speed detected by the vehicle speed detecting unit.

Thus, the amplitude of the control signal is adjusted by varying the amplitude of the reference signal in accordance with the amount of change in rotational frequency, which is a time differential value of the rotational frequency of the engine, the load of the driving source, and the vehicle speed. Accordingly, for example, even if the increase in the vehicle speed is delayed from the increase in the rotational frequency of the engine when the accelerator pedal is suddenly depressed, the sound effect is generated in accordance with the amount of change in rotational frequency, the load of the driving source, and the vehicle speed, in addition to the engine rotational frequency. This allows the sound effect more appropriate for the behavior of the vehicle to be produced.

According to the present disclosure, it is possible to achieve at least one of generation of a more natural sound effect and application to an electric vehicle.

BRIEF DESCRIPTION OF THE DRAWINGS

The advantages of the disclosure will become apparent in the following description taken in conjunction with the following drawings.

DETAILED DESCRIPTION

A. First Embodiment

A1. Entire Configuration and Configuration of Each Component

A1-1. Entire Configuration

Figure 1:
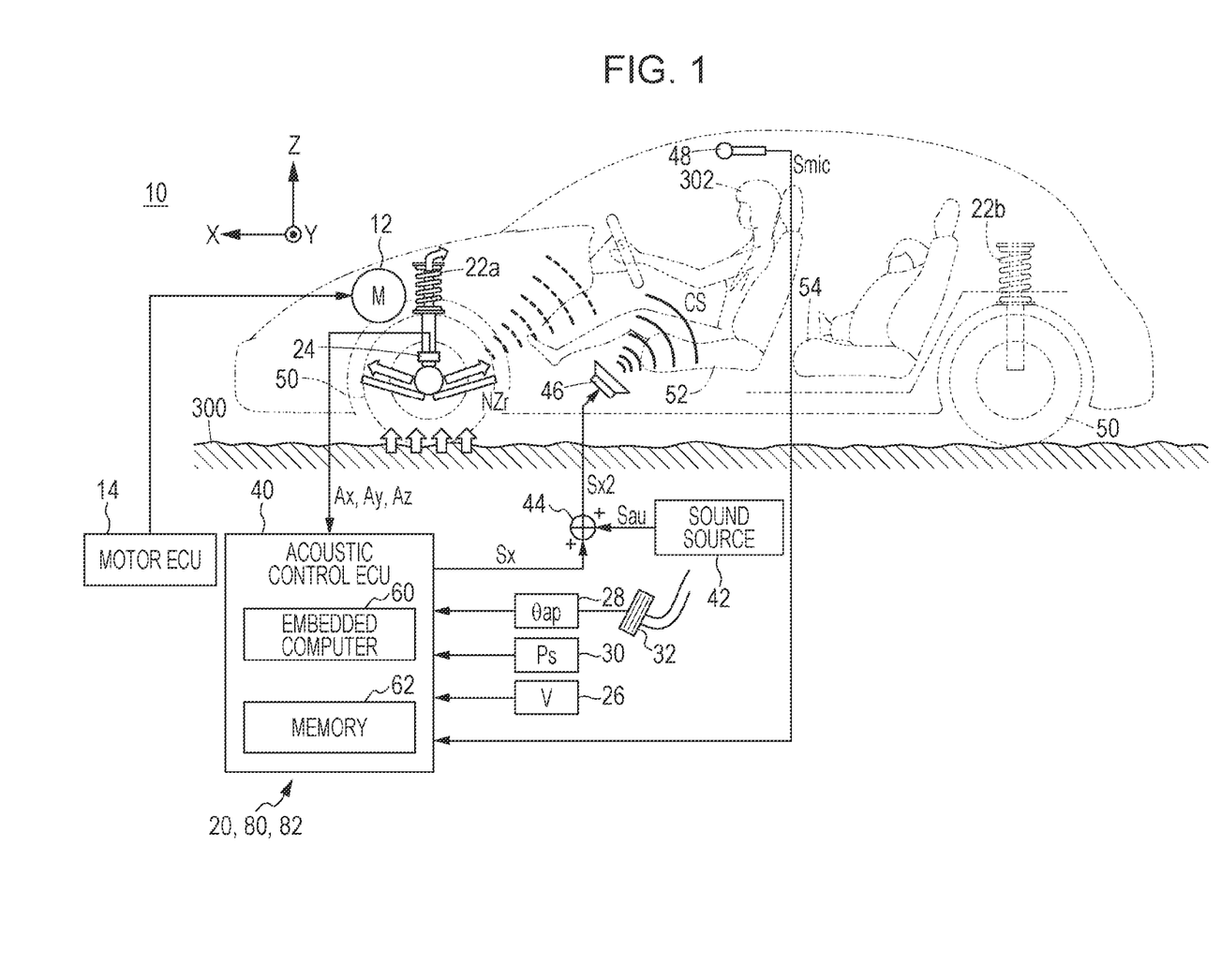
FIG. 1 schematically illustrates an exemplary configuration of a vehicle including an active sound effect generating apparatus (hereinafter referred to as an "ASC apparatus") according to a first embodiment of the present disclosure.
Figure 2:
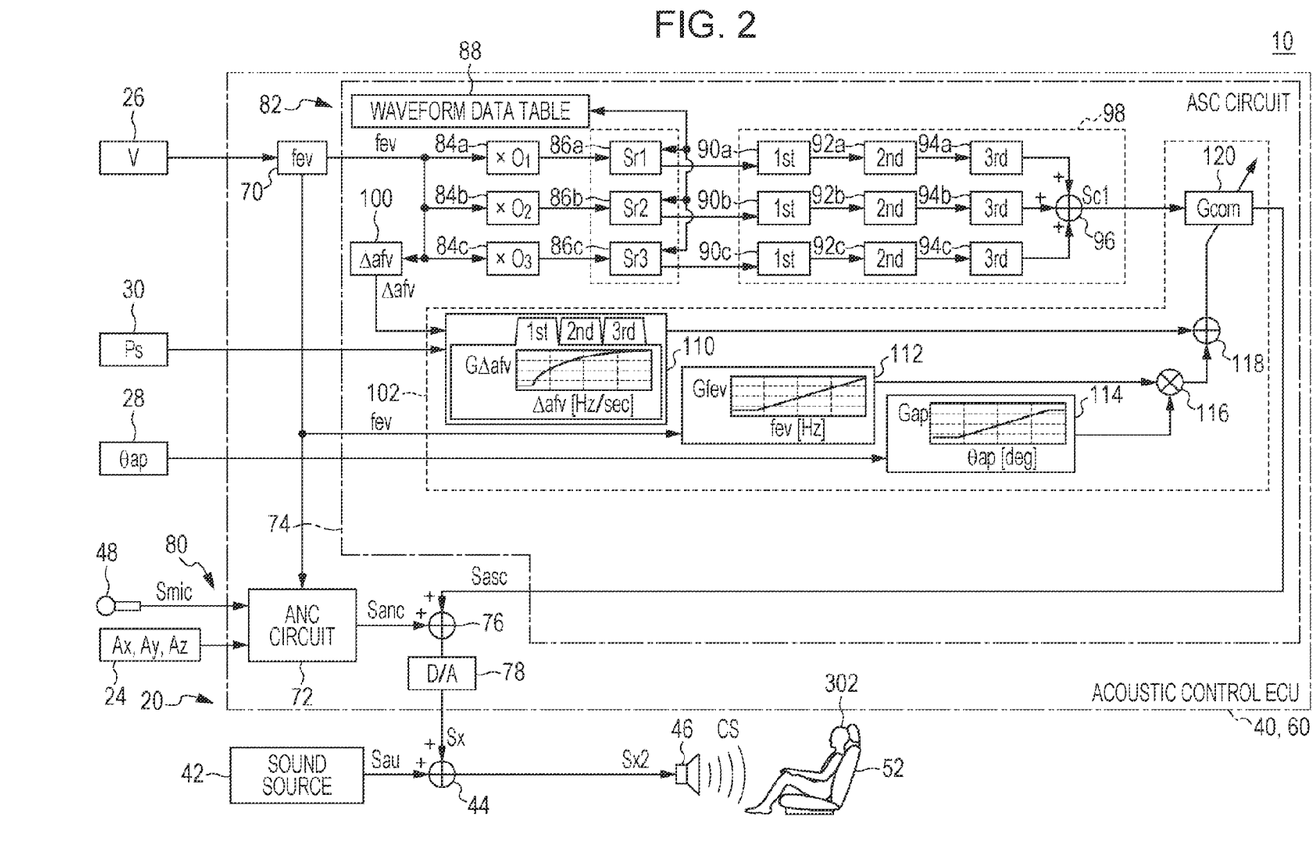
FIG. 2 illustrates the ASC apparatus according to the first embodiment and an exemplary schematic circuit configuration around the ASC apparatus.

FIG. 1 schematically illustrates an exemplary configuration of a vehicle 10 including an active sound effect generating apparatus 82 (hereinafter referred to as an "ASC apparatus 82") according to a first embodiment of the present disclosure. FIG. 2 illustrates the ASC apparatus 82 according to the first embodiment and an exemplary schematic circuit configuration around the ASC apparatus 82. The vehicle 10 is an electric vehicle including a driving motor 12 (hereinafter also referred to as a "motor 12") serving as a driving source (especially, an electric vehicle including only the motor 12 as the driving source). The motor 12 is controlled by a motor electronic control unit 14 (hereinafter referred to as a "motor ECU 14").

The vehicle 10 includes an acoustic system 20, multiple front-wheel suspensions 22a, multiple rear-wheel suspensions 22b, multiple acceleration sensor units 24 provided in the front-wheel suspensions 22a, a vehicle speed sensor 26, an accelerator position sensor 28, and a gear shift position sensor 30, in addition to the motor 12 and the motor ECU 14.

The acceleration sensor units 24 detect vibration accelerations Ax, Ay, and Az [mm/s/s] of the front-wheel suspensions 22a in a front-back direction (an X direction in FIG. 1), a left-right direction (a Y direction in FIG. 1), and an up-down direction (a Z direction in FIG. 1) of the vehicle 10 and supply the detected vibration accelerations Ax, Ay, and Az to the acoustic system 20.

The vehicle speed sensor 26 detects a vehicle speed V [km/h] of the vehicle 10. The accelerator position sensor 28 detects an amount of operation of an accelerator pedal 32 (hereinafter referred to as an "accelerator opening degree θap") [deg]. The gear shift position sensor 30 detects the position of a shift lever (not illustrated) (hereinafter referred to as a "shift position Ps").

A1-2. Acoustic System 20

A1-2-1. Entire Configuration of Acoustic System 20

The acoustic system 20 has a function to receive and output a radio broadcast program, to play back music, etc. (an audio function), a function to perform active noise control (an active noise control function or an ANC function), and a function to perform active sound effect generation control (an active sound effect generation control function or an ASC function).

In order to realize the above functions, the acoustic system 20 includes an acoustic control electronic control unit 40 (hereinafter referred to as an "acoustic control ECU 40" or an "ECU 40"), a sound source 42, an adder 44, a speaker 46, and a microphone 48. An amplifier (not illustrated) may be provided between the adder 44 and the speaker 46.

The ECU 40 selectively realizes the ANC function and the ASC function, among the three functions of the acoustic system 20, and supplies a control signal Sx, which is an output from the acoustic system 20, to the adder 44.

When the ANC function, of the ANC function and the ASC function, is being performed, the control signal Sx output from the ECU 40 defines a cancellation sound to cancel a noise (a road noise NZr) occurring in the vehicle interior due to contact between wheels 50 and a road surface 300 while the vehicle 10 is running. When the ASC function is being performed, the control signal Sx defines a sound effect (a pseudo engine sound) equivalent to a noise (a muffled engine sound) occurring in the vehicle interior in response to an operation (vibration) of an engine. As described above, the vehicle 10 of the first embodiment includes only the motor 12 as the driving source and does not include an engine. Accordingly, the pseudo engine sound is a sound effect output from the speaker 46 if an engine is installed in the vehicle 10. Another sound effect (for example, a pseudo motor sound) may be output, instead of the pseudo engine sound. The acoustic system 20 will be described in detail below.

The sound source 42 is composed of an audio device and a navigation apparatus. The sound source 42 supplies an audio signal Sau that defines, for example, music or audio routing assistance to the adder 44.

The adder 44 adds the control signal Sx from the ECU 40 to the audio signal Sau from the sound source 42 to generate a control signal Sx2 and supplies the control signal Sx2 to the speaker 46.

The speaker 46 is provided at a front seat 52 (a driver seat) side of the vehicle 10 (for example, in a front door panel at each side, in a kick panel at each side (for example, in the inside of the door near a driver leg space), or in the roof above the driver seat). The speaker 46 supplies a control sound CS defined by the control signal Sx2 from the adder 44 to a driver 302 (occupant). Accordingly, the control sound CS is output as the cancellation sound cancelling the road noise NZr when the ECU 40 is performing the ANC function and the control sound CS is output as the sound effect (pseudo engine sound) when the ECU 40 is performing the ASC function. The speaker 46 may be provided at a rear seat 54 side, in addition to the front seat 52 side.

The microphone 48 is disposed at a position (evaluation position) near the position of an ear of the driver 302 to detect a sound at the position. The microphone 48 generates an electrical signal (a microphone signal Smic) corresponding to the detected sound and supplies the microphone signal Smic to the ECU 40. The sound detected by the microphone 48 when the ECU 40 is performing the ANC function is a residual noise remaining after an interior sound, such as the muffled engine sound, has been cancelled out by the cancellation sound. In this case, the microphone signal Smic is an error signal indicating the residual noise.

A1-2-2. Acoustic Control ECU 40

A1-2-2-1. Entire Configuration of Acoustic Control ECU 40

As described above, the ECU 40 selectively performs an ANC process and an ASC process. The ECU 40 includes an embedded computer 60 and a memory 62 (FIG. 1), which are hardware components. The embedded computer 60 is capable of performing the functions including the ANC function and the ASC function with a dedicated circuit or through software processes.

As illustrated in FIG. 2, the ECU 40 includes a virtual engine rotational frequency setter 70 (hereinafter also referred to as a "fev setter 70"), an ANC circuit 72, an ASC circuit 74, an adder 76, and a digital-to-analog converter 78 (hereinafter also referred to as a "D/A converter 78").

The acceleration sensor units 24, the speaker 46, the microphone 48, and the ANC circuit 72 compose an active noise control apparatus 80 (hereinafter referred to as an "ANC apparatus 80"). The vehicle speed sensor 26, the accelerator position sensor 28, the gear shift position sensor 30, the speaker 46, and the ASC circuit 74 compose the ASC apparatus 82.

The selection between the ANC apparatus 80 and the ASC apparatus 82 (that is, the selection between an output from the ANC circuit 72 and an output from the ASC circuit 74) is performed through a switching determination process (not illustrated). Accordingly, the control signal Sx output from the acoustic control ECU 40 corresponds to either of the output signal (control signal Sanc) from the ANC circuit 72 or the output signal (control signal Sasc) from the ASC circuit 74.

A1-2-2-2. fev Setter 70

The fev setter 70 sets a virtual engine rotational frequency fev (hereinafter also referred to as a "virtual frequency fev")

[Hz] in accordance with the vehicle speed V and supplies the virtual frequency fev to the ASC circuit 74. The virtual frequency fev means the rotational frequency of an engine (virtual engine) if an engine is installed in the vehicle 10. In the first embodiment, the virtual frequency fev is set on the basis of the vehicle speed V.

A frequency, which is a fundamental frequency, is set in advance in accordance with the vehicle speed V in the fev setter 70. In other words, the fev setter 70 includes a map in which the relationship between the vehicle speed V and the fundamental frequency is set in advance. For example, when the vehicle speed V has a value of V1, the fev setter 70 stores a fundamental frequency fev1 in advance. Accordingly, for example, the value of the fundamental frequency is identified upon identification of the vehicle speed V. One fundamental frequency or multiple fundamental frequencies are selected depending on the vehicle speed V.

A1-2-2-3. ANC Circuit 72

As described above, the ANC circuit 72 performs the ANC function. For example, a specific configuration of the ANC circuit 72 is described in, for example, Japanese Unexamined Patent Application Publication No. 2012-131315, the entire contents of which are incorporated herein by reference.

A1-2-2-4. ASC Circuit 74

A1-2-2-4-1. Summary of ASC Circuit 74

The ASC circuit 74 generates the sound effect, which is a virtual muffled engine sound, to improve the acoustic effect in the vehicle interior, for example, by enhancing the variation in speed of the vehicle 10.

As illustrated in FIG. 2, the control signal Sasc from the ASC circuit 74 is added to the control signal Sanc from the ANC circuit 72 in the adder 76. As described above, the ANC circuit 72 and the ASC circuit 74 operate selectively. Accordingly, the control signal Sx output from the adder 76 is equal to the control signal Sasc from the ASC circuit 74 or the control signal Sanc from the ANC circuit 72.

A1-2-2-4-2. Entire Configuration of ASC Circuit 74

As illustrated in FIG. 2, the ASC circuit 74 includes a control signal generator 98 (part of a control signal generating unit) including harmonic multipliers 84*a*, 84*b*, and 84*c*, reference signal generators 86*a*, 86*b*, and 86*c*, a waveform data table 88, first acoustic correctors 90*a*, 90*b*, and 90*c*, second acoustic correctors 92*a*, 92*b*, and 92*c*, third acoustic correctors 94*a*, 94*b*, and 94*c*, and an adder 96; an amount-of-change-in-frequency detector 100 (hereinafter also referred to as a "Δafv detector 100"); and a total-sound-volume corrector 102. The components in the ASC circuit 74 are similar to those described in, for example, Japanese Unexamined Patent Application Publication No. 2013-167851 or Japanese Unexamined Patent Application Publication No. 2006-301598, and its corresponding US 2006/0215846 the entire contents of which are incorporated herein by reference.

Each of the harmonic multipliers 84*a*, 84*b*, and 84*c* generates a harmonic signal having a frequency of a certain order (certain multiple) of the virtual engine rotational frequency fev. Specifically, the harmonic multiplier 84*a* generates the $0_1$ order (for example, second) harmonic signal, the harmonic multiplier 84*b* generates the $0_2$ order (for example, third) harmonic signal, and the harmonic multiplier 84*c* generates the $0_3$ order (for example, fourth) harmonic signal.

The reference signal generators 86*a*, 86*b*, and 86*c* generate reference signals Sr1, Sr2, and Sr3, respectively, using the harmonic signals from the harmonic multipliers 84*a*, 84*b*, and 84*c* and waveform data stored in the waveform data table 88 and supply the generated reference signals Sr1, Sr2, and Sr3 to the first acoustic correctors 90*a*, 90*b*, and 90*c*, respectively.

The first acoustic correctors 90*a*, 90*b*, and 90*c* perform flattening to generate the control sound CS, which is the sound effect having a sense of linearity for the acceleration operation, in an ear of the driver 302 (refer to paragraphs [0044] to [0051] in Japanese Unexamined Patent Application Publication No. 2006-301598). The second acoustic correctors 92*a*, 92*b*, and 92*c* perform frequency enhancement to enhance only a desired frequency in the control sound CS, which is the sound effect (refer to paragraphs [0054] to [0057] in Japanese Unexamined Patent Application Publication No. 2006-301598). The third acoustic correctors 94*a*, 94*b*, and 94*c* perform correction for every order to correct the reference signals Sr1, Sr2, and Sr3 depending on the orders (refer to paragraph [0063] in Japanese Unexamined Patent Application Publication No. 2006-301598).

The reference signals Sr1, Sr2, and Sr3 through the first acoustic correctors 90*a*, 90*b*, and 90*c*, the second acoustic correctors 92*a*, 92*b*, and 92*c*, and the third acoustic correctors 94*a*, 94*b*, and 94*c* are added to each other in the adder 96, thereby generating a control signal Sc1.

The configuration of the control signal generator 98 is not limited to the above one and may be appropriately varied. For example, the control signal generator 98 may be composed of any one kind or any two kinds of the first acoustic correctors 90*a*, 90*b*, and 90*c*, the second acoustic correctors 92*a*, 92*b*, and 92*c*, and the third acoustic correctors 94*a*, 94*b*, and 94*c*.

The Δafv detector 100 detects a time differential value of the virtual frequency fev (hereinafter also referred to as an "amount-of-change-in virtual engine rotational frequency Δafv" or an "amount-of-change-in-frequency Δafv") [Hz/s] on the basis of the virtual frequency fev from the fev setter 70 and supplies the amount-of-change-in virtual engine rotational frequency Δafv to the total-sound-volume corrector 102.

The total-sound-volume corrector 102 (part of the control signal generating unit) corrects the volume of the control sound CS (sound effect) in accordance with the virtual frequency fev, the amount-of-change-in virtual engine rotational frequency Δafv, the accelerator opening degree θap, and the shift position Ps.

A1-2-2-4-3. Detailed Description of Total-Sound-Volume Corrector 102

As described above, the total-sound-volume corrector 102 corrects the volume of the control sound CS (sound effect) output from the speaker 46 in accordance with the virtual frequency fev, the amount-of-change-in-frequency Δafv, the accelerator opening degree θap, and the shift position Ps.

As illustrated in FIG. 2, the total-sound-volume corrector 102 includes a first gain setter 110, a second gain setter 112, a third gain setter 114, a multiplier 116, an adder 118, and a total-sound-volume correction filter 120.

The first gain setter 110 sets a gain based on the shift position Ps and the amount-of-change-in-frequency Δafv (such a gain is hereinafter referred to as an "amount-ofchange-in-frequency gain GΔafv" or a "first gain GΔafv"). More specifically, a map in which the relationship between the amount-of-change-in-frequency Δafv and the first gain GΔafv is defined is set in advance for each shift position Ps (a combination of first, second, and third or a combination of a D range and a B range). The first gain setter 110 switches the map on the basis of the shift position Ps notified from the gear shift position sensor 30. Then, the first gain setter 110 sets the first gain GΔafv on the basis of the amount-of-change-in-frequency Δafv from the Δafv detector 100. The first gain setter 110 may be configured so as not to use the shift position Ps.

The second gain setter 112 sets a gain based on the virtual engine rotational frequency fev (such a gain is hereinafter referred to as a "frequency gain Gfev" or a "second gain Gfev"). More specifically, a map in which the relationship between the virtual frequency fev and the second gain Gfev is defined is set in advance. The second gain setter 112 sets the second gain Gfev on the basis of the virtual frequency fev from the fev setter 70.

The third gain setter 114 sets a gain based on the accelerator opening degree θap (such a gain is hereinafter referred to as an "accelerator opening degree gain Gap" or a "third gain Gap"). More specifically, a map in which the relationship between the accelerator opening degree θap and the third gain Gap is defined is set in advance. The third gain setter 114 sets the third gain Gap on the basis of the accelerator opening degree θap detected by the accelerator position sensor 28.

The multiplier 116 multiplies the second gain Gfev (frequency gain Gfev) set by the second gain setter 112 by the third gain Gap (accelerator opening degree gain Gap) set by the third gain setter 114 and supplies the result of the multiplication to the adder 118.

The adder 118 (fourth gain setter) adds the first gain GΔafv (amount-of-change-in-frequency gain GΔafv) set by the first gain setter 110 to the product of the second gain Gfev and the third gain Gap, calculated in the multiplier 116, to calculate a common correction gain Gcom (hereinafter also referred to as a "fourth gain Gcom").

The total-sound-volume correction filter 120 multiplies the control signal Sc1 from the adder 96 by the fourth gain Gcom calculated by the adder 118 to generate the control signal Sasc (amplitude adjustment control signal). The total-sound-volume correction filter 120 supplies the generated control signal Sasc to the adder 76.

A2. Advantages in First Embodiment

As described above, according to the first embodiment, the virtual engine rotational frequency fev (vehicle speed corresponding frequency) defined on the basis of the vehicle speed V is set to calculate the amount-of-change-in-frequency Δafv, which is the time differential value of the virtual frequency fev (FIG. 2). The amplitude of the control signal Sc1 (the amplitudes of the reference signals Sr1, Sr2, and Sr3) is varied in accordance with the amount-of-change-in-frequency Δafv and the accelerator opening degree θap (the load of the driving source) to adjust the amplitude of the control signal Sasc (FIG. 2). This allows the sound effect appropriate for the behavior of the vehicle 10 to be produced even when the vehicle 10 is an electric vehicle that is not provided with the engine serving as the driving source.

In the first embodiment, the frequency, which is the fundamental frequency, is set in advance in accordance with the vehicle speed V in the fev setter 70 (frequency setting unit). This allows a dominant portion in the control sound CS serving as the sound effect to be represented at the fundamental frequency corresponding to the vehicle speed V. Accordingly, it is possible to generate the more natural sound effect for the driver 302.

B. Second Embodiment

B1. Entire Configuration and Configuration of Each Component (Difference from First Embodiment)

B1-1. Entire Configuration

Figure 3:
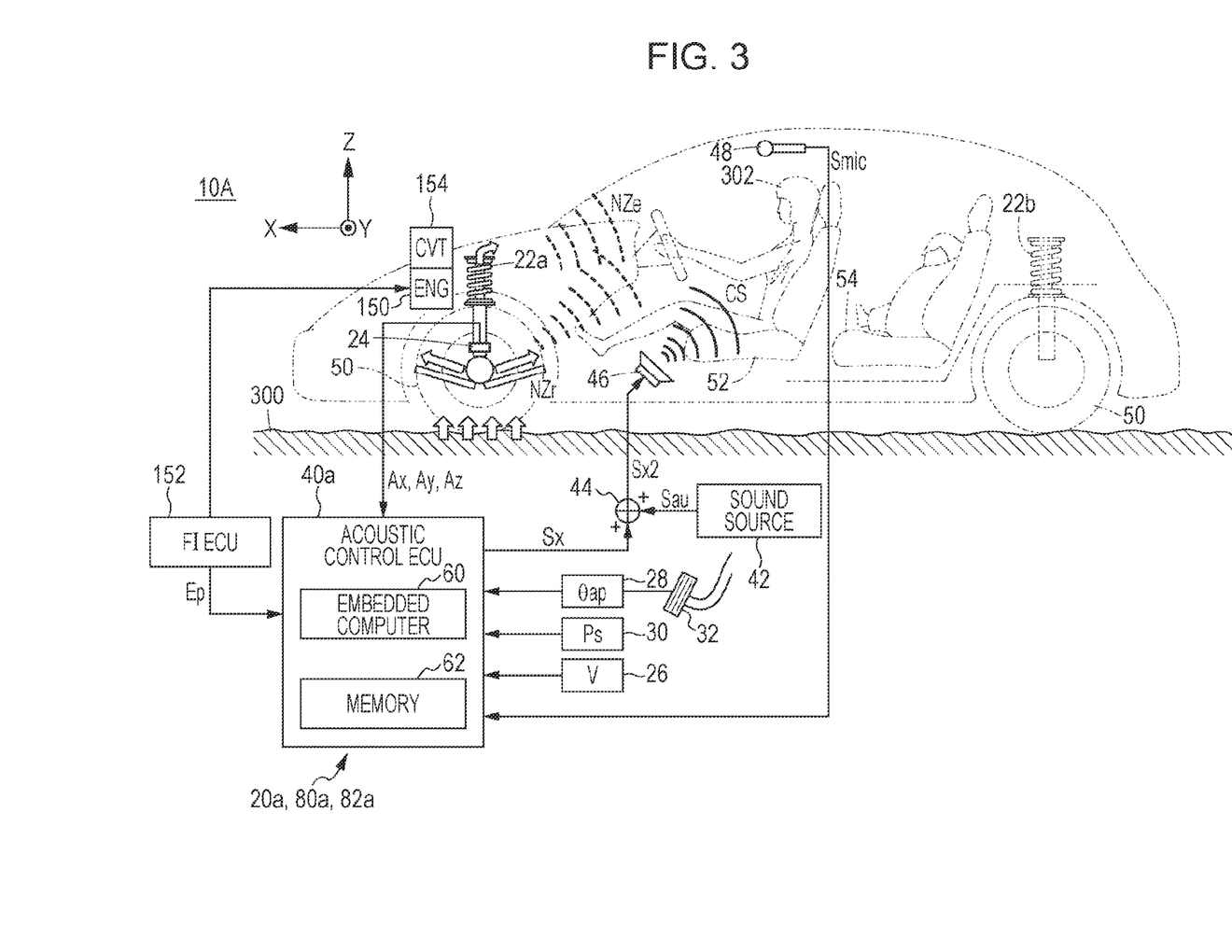
FIG. 3 schematically illustrates an exemplary configuration of a vehicle including an ASC apparatus according to a second embodiment of the present disclosure.
Figure 4:
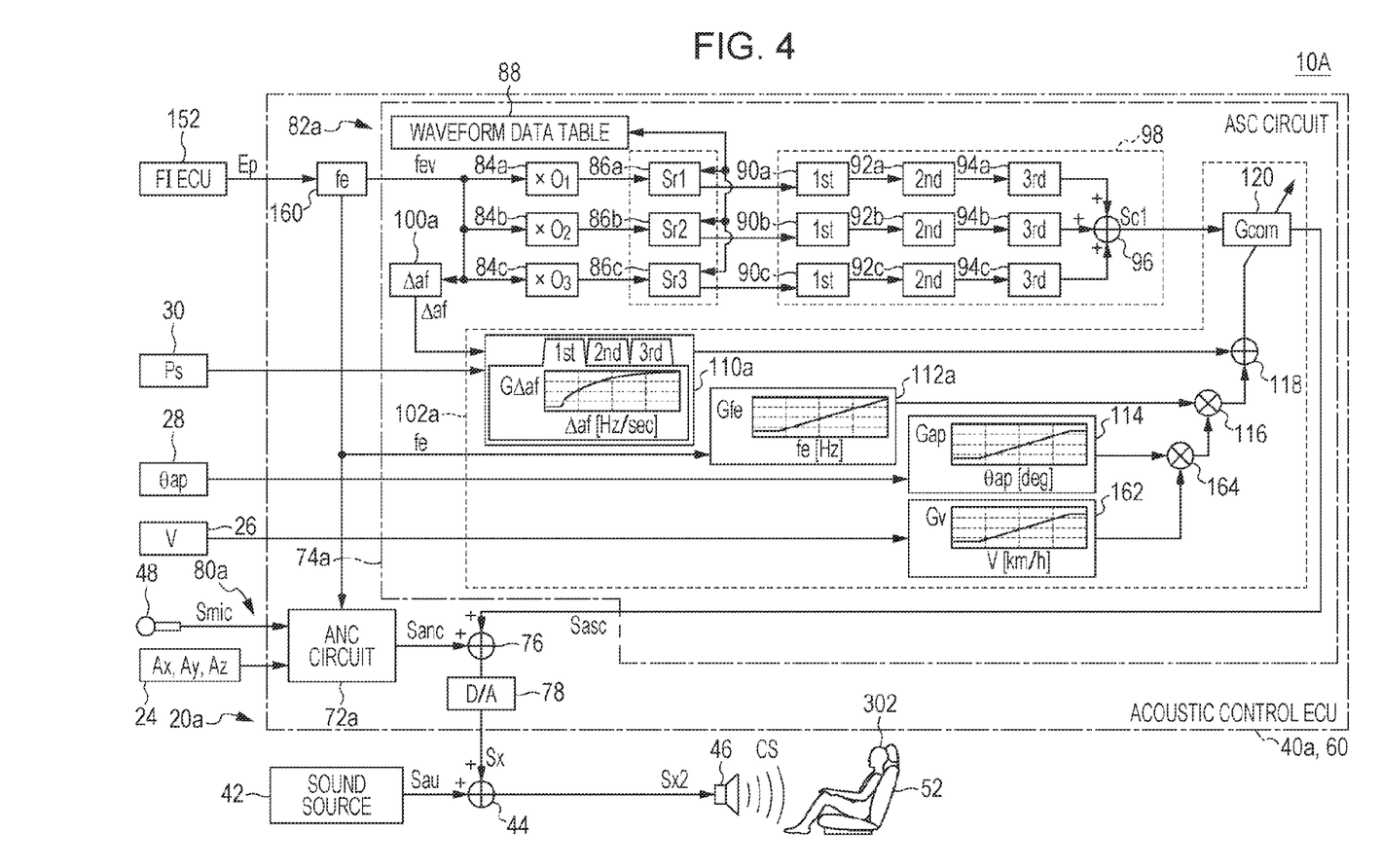
FIG. 4 illustrates the ASC apparatus according to the second embodiment and an exemplary schematic circuit configuration around the ASC apparatus.

FIG. 3 schematically illustrates an exemplary configuration of a vehicle 10A including an active sound effect generating apparatus 82a (hereinafter referred to as an "ASC apparatus 82a") according to a second embodiment of the present disclosure. FIG. 4 illustrates the ASC apparatus 82a according to the second embodiment and an exemplary schematic circuit configuration around the ASC apparatus 82a. The same reference numerals are used in the second embodiment to identify the same components in the first embodiment. A description of such components is omitted herein.

The vehicle 10 of the first embodiment is the electric vehicle including the driving motor 12 as the driving source while the vehicle 10A of the second embodiment is a vehicle including an engine 150 as the driving source. The engine 150 is controlled by a fuel injection electronic control unit 152 (hereinafter referred to as an "FI ECU 152"). In addition, the engine 150 is connected to a continuously variable transmission 154 (hereinafter referred to as a "CVT 154"). A transmission gear ratio or the like of the CVT 154 is controlled by a CVT electronic control unit (CVT ECU) (not illustrated).

The ANC function performed by the acoustic system 20 of the first embodiment is targeted at the road noise NZr. In contrast, the ANC function performed by an acoustic system 20a of the second embodiment is targeted at not only the road noise NZr but also a noise (muffled engine sound NZe) occurring in the vehicle interior in response to the operation (vibration) of the engine 150.

The reference signals Sr1, Sr2, and Sr3 are generated on the basis of the vehicle speed V (the virtual engine rotational frequency fev) with the ASC function performed by the acoustic system 20 of the first embodiment (FIG. 2). In other words, the vehicle speed V is used for the generation of the reference signals Sr1, Sr2, and Sr3. In contrast, the reference signals Sr1, Sr2, and Sr3 are generated on the basis of an engine pulse Ep (an engine rotational frequency fe) output from the FI ECU 152 with the ASC function performed by the acoustic system 20a of the second embodiment. In addition, in the acoustic system 20a of the second embodiment, the amplitudes of the reference signals Sr1, Sr2, and Sr3 (or the amplitude of the control signal Sc1 based on the reference signals Sr1, Sr2, and Sr3) are adjusted on the basis of the vehicle speed V.

B1-2. Acoustic System 20a

B1-2-1. Entire Configuration of Acoustic System 20a

The acoustic system 20a of the second embodiment differs from the acoustic system 20 of the first embodiment in that the acoustic system 20a of the second embodiment includes an acoustic control electronic control unit 40a (hereinafter referred to as an "acoustic control ECU 40a" or an "ECU 40a"), instead of the ECU 40 of the first embodiment.

B1-2-2. Acoustic Control ECU 40a

As illustrated in FIG. 4, the ECU 40a includes an engine rotational frequency detector 160 (hereinafter also referred to as a "fe detector 160"), an ANC circuit 72a, an ASC circuit 74a, the adder 76, and the digital-to-analog converter 78 (hereinafter also referred to as the "D/A converter 78").

The acceleration sensor units 24, the speaker 46, the microphone 48, the ANC circuit 72a, and the fe detector 160 compose an active noise control apparatus 80a (hereinafter referred to as an "ANC apparatus 80a"). The vehicle speed sensor 26, the accelerator position sensor 28, the gear shift position sensor 30, the speaker 46, the ASC circuit 74a, and the fe detector 160 compose the ASC apparatus 82a.

B1-2-3. fe Detector 160

The fe detector 160 detects the engine rotational frequency fe [Hz] on the basis of the engine pulse Ep from the FI ECU 152. The fe detector 160 supplies the detected engine rotational frequency fe to the ANC circuit 72a and the ASC circuit 74a.

The virtual engine rotational frequency fev is used in the first embodiment (FIG. 2). In contrast, the engine rotational frequency fe, which is an actual rotational frequency of the engine 150, is used in the second embodiment.

B1-2-4. ANC Circuit 72a

As described above, the ANC function performed by the ANC circuit 72a of the second embodiment is targeted at not only the road noise NZr but also the noise (muffled engine sound NZe) occurring in the vehicle interior in response to the operation (vibration) of the engine 150. For example, a specific configuration of the ANC circuit 72a is described in, for example, Japanese Unexamined Patent Application Publication No. 2012-131315 or Japanese Unexamined Patent Application Publication No. 2004-361721, and its corresponding US 2004/0247137 the entire contents of which are incorporated herein by reference.

B1-2-5. ASC Circuit 74a

The ASC circuit 74a of the second embodiment basically has the same configuration as that of the ASC circuit 74 of the first embodiment. However, an amount-of-change-in-frequency detector 100a (hereinafter also referred to as a "Δaf detector 100a") and a total-sound-volume corrector 102a in the ASC circuit 74a differ from the Δafv detector 100 and the total-sound-volume corrector 102 in the ASC circuit 74, respectively.

The Δaf detector 100a detects a time differential value of the engine rotational frequency fe (hereinafter also referred to as an "amount-of-change-in engine rotational frequency Δaf" or an "amount-of-change-in-frequency Δaf") [Hz/s] on the basis of the engine rotational frequency fe from the fe detector 160 and supplies the amount-of-change-in engine rotational frequency Δaf to the total-sound-volume corrector 102a.

The total-sound-volume corrector 102a corrects the volume of the control sound CS (sound effect) in accordance with the engine rotational frequency fe, the amount-of-change-in engine rotational frequency Δaf, the accelerator opening degree θap, and the shift position Ps.

As illustrated in FIG. 4, the total-sound-volume corrector 102a includes a first gain setter 110a, a second gain setter 112a, the third gain setter 114, a fourth gain setter 162, the multiplier 116, a multiplier 164, the adder 118, and the total-sound-volume correction filter 120.

The first gain setter 110a sets a gain based on the shift position Ps and the amount-of-change-in-frequency Δaf (such a gain is hereinafter referred to as an "amount-of-change-in-frequency gain GΔaf" or a "first gain GΔaf"), as in the first gain setter 110.

The second gain setter 112a sets a gain based on the engine rotational frequency fe (such a gain is hereinafter referred to as a "frequency gain Gfe" or a "second gain Gfe"), as in the second gain setter 112.

The fourth gain setter 162 sets a gain based on the vehicle speed V (such a gain is hereinafter referred to as a "vehicle speed gain Gv"). More specifically, a map in which the relationship between the vehicle speed V and the vehicle speed gain Gv is defined is set in advance. The fourth gain setter 162 sets the vehicle speed gain Gv on the basis of the vehicle speed V detected by the vehicle speed sensor 26.

The multiplier 164 multiplies the accelerator opening degree gain Gap set by the third gain setter 114 by the vehicle speed gain Gv set by the fourth gain setter 162 and supplies the result of the multiplication to the multiplier 116. Accordingly, the vehicle speed V is reflected in the outputs from the multiplier 116 and the adder 118 and the common correction gain Gcom used in the total-sound-volume correction filter 120.

B2. Exemplary Data when Second Embodiment is Used

Figure 5:
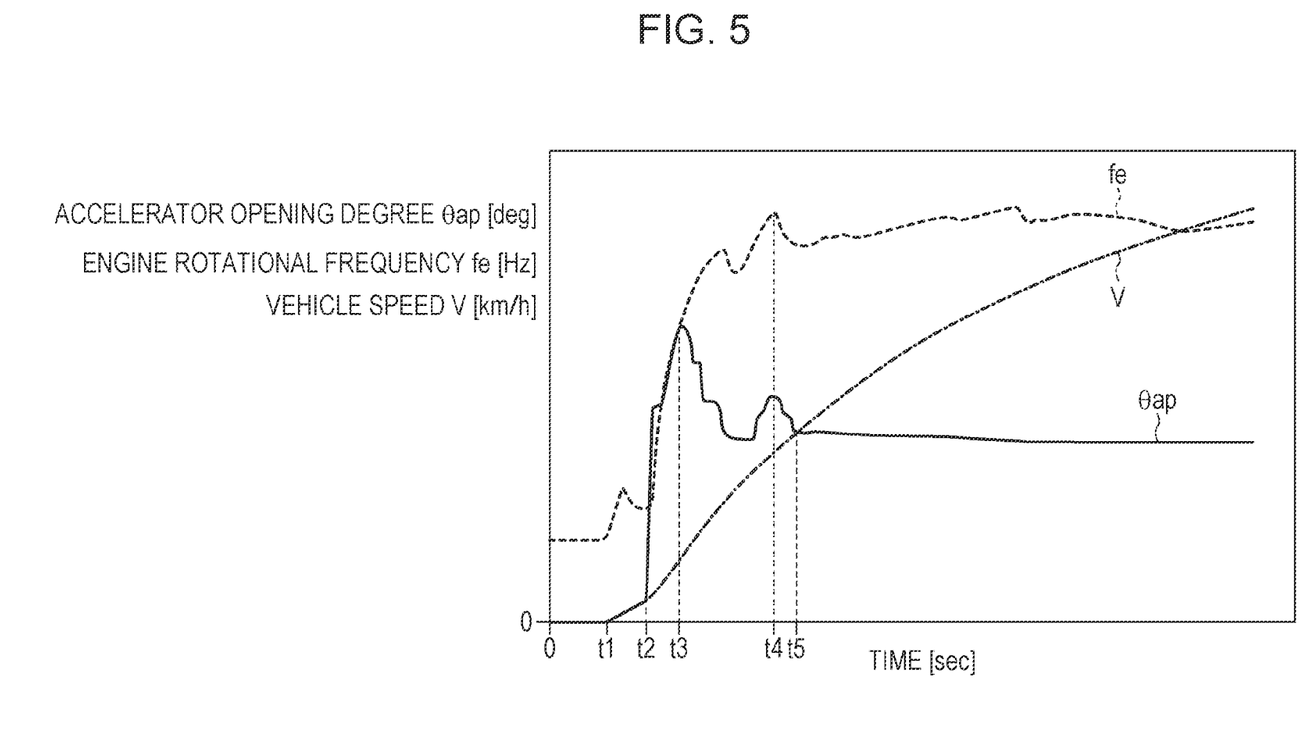
FIG. 5 illustrates an example of time series data about an accelerator opening degree, an engine rotational frequency, and a vehicle speed when the ASC apparatus according to the second embodiment and a sound effect generating apparatus according to a comparative example are used.
Figure 6:
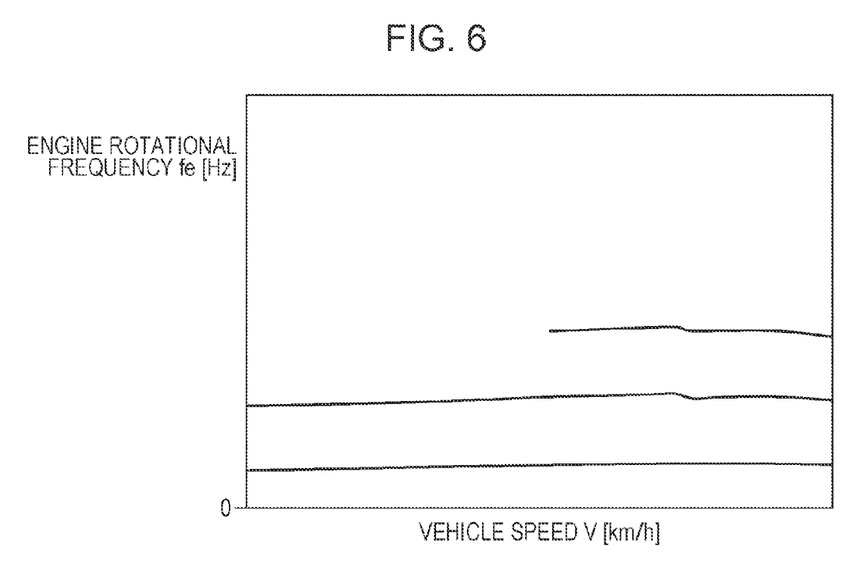
FIG. 6 illustrates an example of the relationship between the vehicle speed, the engine rotational frequency, and a sound pressure level of a control sound (sound effect) when the sound effect generating apparatus according to the comparative example is used.
Figure 7:
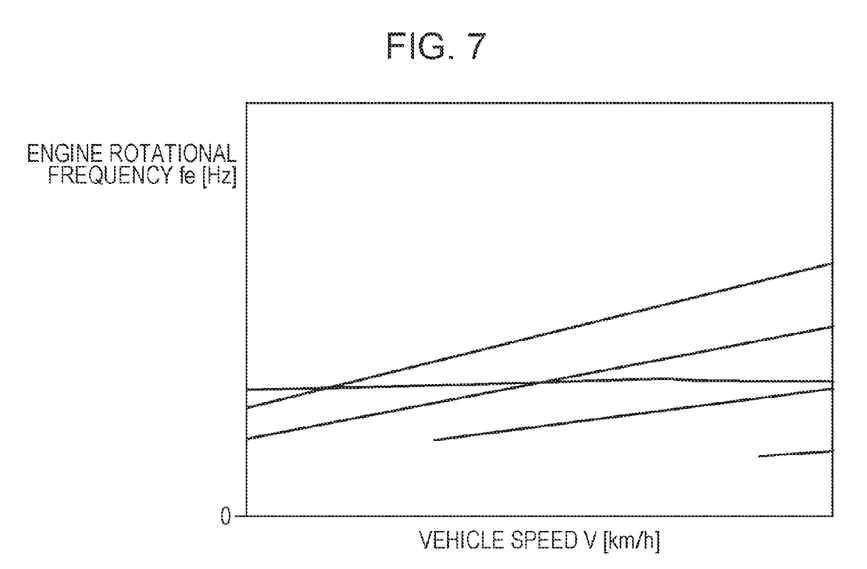
FIG. 7 illustrates an example of the relationship between the vehicle speed, the engine rotational frequency, and the sound pressure level of the control sound (sound effect) when the ASC apparatus according to the second embodiment is used.

FIG. 5 illustrates an example of time series data about the accelerator opening degree θap, the engine rotational frequency fe, and the vehicle speed V when the ASC apparatus 82a according to the second embodiment and a sound effect generating apparatus according to a comparative example are used. FIG. 6 illustrates an example of the relationship between the vehicle speed V, the engine rotational frequency fe, and a sound pressure level Ls [dB] of the control sound CS (sound effect) when the sound effect generating apparatus according to the comparative example is used. FIG. 7 illustrates an example of the relationship between the vehicle speed V, the engine rotational frequency fe, and the sound pressure level Ls [dB] of the control sound CS (sound effect) when the ASC apparatus 82a according to the second embodiment is used.

The comparative example has, for example, the configuration described in Japanese Unexamined Patent Application Publication No. 2013-167851 and the gain adjustment in accordance with the vehicle speed V is not performed in the comparative example. Solid lines in FIG. 6 and FIG. 7 illustrate the control sounds CS (sound effects) the sound pressure levels Ls of which exceed a certain sound pressure level threshold value.

In the example in FIG. 5, the accelerator opening degree θap starts to increase at a time t1, sharply increases from a time t2 to a time t3, and subsequently decreases. After a time t5, the accelerator opening degree θap is kept at a substantially equal value. The engine rotational frequency fe sharply increases from the time t2 to a time t4 and is subsequently kept at a substantially equal value. The vehicle speed V continuously increases from the time t1 to the time t5. However, the vehicle speed V increases gradually, compared with the accelerator opening degree θap. After the time t3, the accelerator opening degree θap decreases or is hardly varied while the vehicle speed V continues to increase.

In the case of the comparative example (FIG. 6), the sound pressure level Ls of the control sound CS (sound effect) is set in accordance with the engine rotational frequency fe. In other words, the solid lines (the engine rotational frequencies fe corresponding to the sound pressure levels Ls exceeding the sound pressure level threshold value) in FIG. 6 are hardly varied with the increase in the vehicle speed V. Accordingly, when the example in FIG. 5 is applied to the comparative example, the sound pressure level Ls increases from the time t1 to the time t3 but the sound pressure level Ls is kept at a constant value or decreases after the time t3.

In contrast, in the case of the second embodiment (FIG. 7), the sound pressure level Ls of the control sound CS is set in accordance with the vehicle speed V, in addition to the engine rotational frequency fe (FIG. 4). In other words, the solid lines in FIG. 7 indicate that the engine rotational frequencies fe corresponding to the sound pressure levels Ls exceeding the sound pressure level threshold value increase in response to the increase in the vehicle speed V. Accordingly, when the example in FIG. 5 is applied to the second embodiment, the increase in the vehicle speed V is capable of being reflected in the sound pressure level Ls while the vehicle speed V is increasing from the time t1 to the time t5 and after the time t5. For example, it is possible to continuously increase the sound pressure level Ls from the time t1 to the time t5. Alternatively, it is possible to keep the sound pressure level Ls or slow down the decrease in the sound pressure level Ls even after the time t3 at which the accelerator opening degree θap starts to decrease or even after the time t5 at which the engine rotational frequency fe is kept at a substantially constant value.

B3. Advantages in Second Embodiment

The ASC apparatus 82a according to the second embodiment has the following advantages, in addition to or instead of the advantages in the first embodiment.

According to the second embodiment, the amplitude of the control signal Sasc is adjusted by varying the amplitude of the control signal Sc1 (the amplitudes of the reference signals Sr1, Sr2, and Sr3) in accordance with the amount-of-change-in-frequency Δaf, the accelerator opening degree θap (the load of the driving source), and the vehicle speed V (FIG. 4). Accordingly, for example, even if the increase in the vehicle speed V is delayed from the increase in the engine rotational frequency fe when the accelerator pedal 32 is suddenly depressed, the sound effect is generated in accordance with the amount-of-change-in-frequency Δaf based on the vehicle speed V and the load of the engine 150, in addition to the engine rotational frequency fe. This allows the sound effect more appropriate for the behavior of the vehicle 10A to be produced.

In particular, the vehicle 10A of the second embodiment includes the CVT 154 (FIG. 3). When the vehicle 10A includes the CVT 154, the variation in the engine rotational frequency fe may not follow the operation of the accelerator pedal 32 on a road, such as a slope, even if the accelerator pedal 32 is depressed by the driver 302. For example, when the accelerator pedal 32 is suddenly depressed, a situation may occur in which the shift transmission by the CVT 154 does not follow the operation of the accelerator pedal 32, the engine rotational frequency fe is increased first, and the vehicle speed V is not immediately increased.

According to the second embodiment, the sound effect is generated in accordance with the amount-of-change-in-frequency Δaf based on the vehicle speed V and the load of the engine 150, in addition to the engine rotational frequency fe. Accordingly, it is possible to resolve the above problems in the vehicle 10A including the CVT 154 to produce the sound effect more appropriate for the behavior of the vehicle 10A.

C. Third Embodiment

C1. Entire Configuration and Configuration of Each Component (Difference from First and Second Embodiments)

C1-1. Entire Configuration

Figure 8:
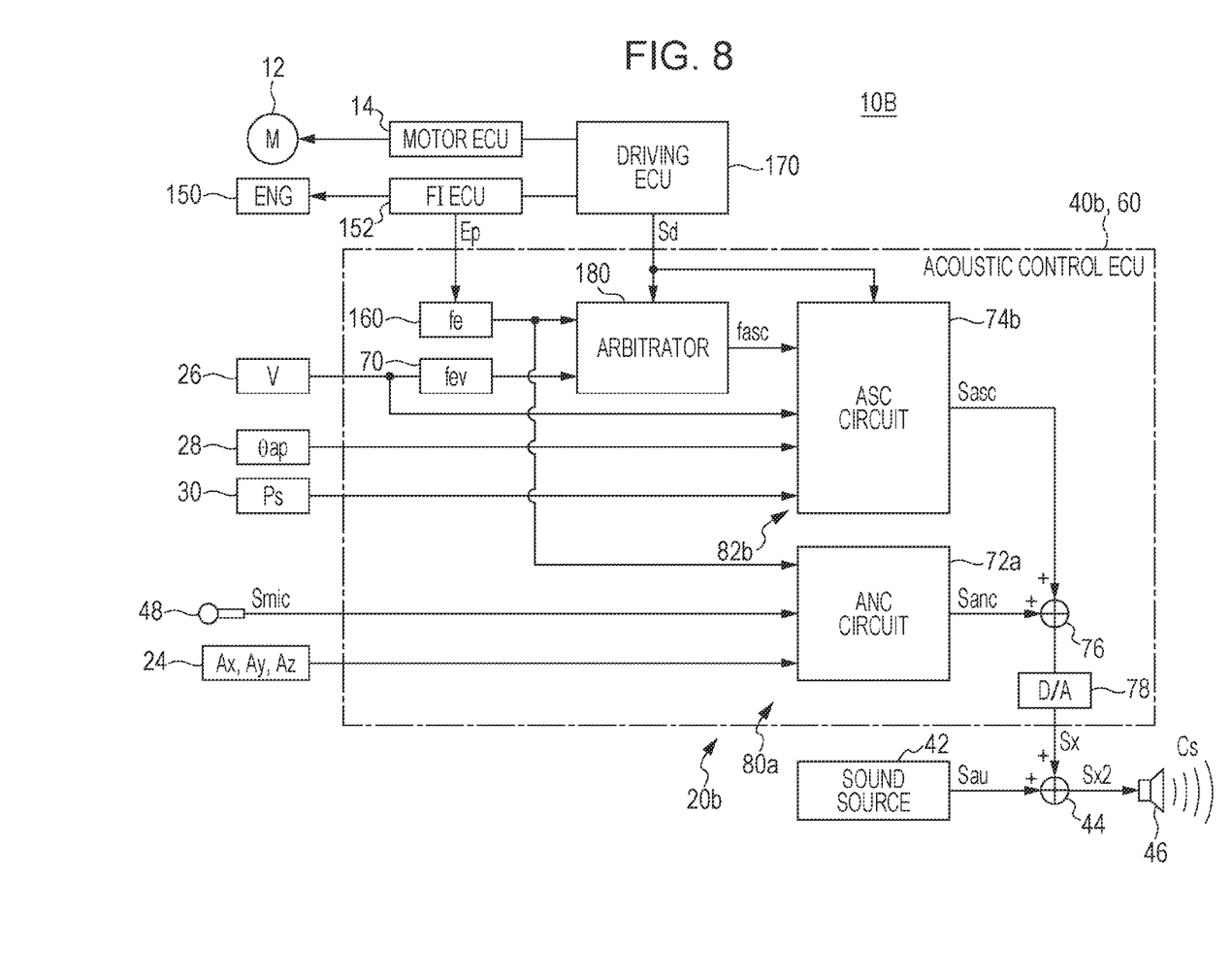
FIG. 8 schematically illustrates an exemplary configuration of a vehicle including an ASC apparatus according to a third embodiment of the present disclosure.

FIG. 8 schematically illustrates an exemplary configuration of a vehicle 10B including an active sound effect generating apparatus 82b (hereinafter referred to as an "ASC apparatus 82b") according to a third embodiment of the present disclosure. The same reference numerals are used in the third embodiment to identify the same components in the first and second embodiments. A description of such components is omitted herein.

The vehicle 10 of the first embodiment is an electric vehicle including the motor 12 as the driving source (FIG. 1) and the vehicle 10A of the second embodiment is a vehicle including the engine 150 as the driving source (FIG. 3). In contrast, the vehicle 10B of the third embodiment is a so-called hybrid vehicle including the motor 12 and the engine 150 as the driving sources (FIG. 8). The motor 12 is controlled by the motor ECU 14 and the engine 150 is controlled by the FI ECU 152. Selection between the motor 12 and the engine 150 as the driving source is performed by a driving electronic control unit 170 (hereinafter referred to as a "driving ECU 170"). The vehicle 10B may include the CVT 154 similar to that in the second embodiment, although not illustrated in FIG. 8.

An acoustic system 20b of the third embodiment switches the acoustic control (switching between the ANC process and the ASC process) in accordance with the driving state of the driving sources composed of the motor 12 and the engine 150.

C1-2. Driving ECU 170

The driving ECU 170 controls the outputs from the motor 12 and the engine 150 on the basis of the outputs from the various sensors and the respective electronic control units (hereinafter referred to as "ECUs"). The driving ECU 170 includes an input-output portion, an arithmetic portion, and a storage portion (not illustrated).

The various sensors from which the driving ECU 170 receives the outputs include, for example, the vehicle speed sensor 26, the accelerator position sensor 28, and the gear shift position sensor 30.

C1-3. Acoustic System 20b

C1-3-1. Entire Configuration of Acoustic System 20b

An acoustic control electronic control unit 40b (hereinafter referred to as an "acoustic control ECU 40b") in the acoustic system 20b of the third embodiment includes the fev setter 70 as in the first embodiment, the fe detector 160 as in the second embodiment, an arbitrator 180, the ANC circuit 72a, an ASC circuit 74b, the adder 76, and the D/A converter 78.

The virtual engine rotational frequency fev from the fev setter 70 is supplied to the arbitrator 180. The engine rotational frequency fe from the fe detector 160 is supplied to the ANC circuit 72a and the arbitrator 180.

C1-3-2. Arbitrator 180

The arbitrator 180 generates a sound effect frequency fasc on the basis of the virtual frequency fev from the fev setter 70 and the engine rotational frequency fe from the fe detector 160 and supplies the sound effect frequency fasc to the ASC circuit 74b. The processing in the arbitrator 180 will be described in detail below.

C1-3-3. ANC Circuit 72a

The ANC circuit 72a and the ANC apparatus 80a in the third embodiment are the same as those in the second embodiment. The ASC circuit 74b is a combination of the ASC circuit 74 (FIG. 2) of the first embodiment and the ASC circuit 74a (FIG. 4) of the second embodiment. The vehicle speed sensor 26, the accelerator position sensor 28, the gear shift position sensor 30, the speaker 46, the fev setter 70, the ASC circuit 74b, the fe detector 160, and the arbitrator 180 compose the active sound effect generating apparatus 82b (hereinafter referred to as the "ASC apparatus 82b").

C1-3-4. ASC Circuit 74b

The ASC circuit 74b may have, for example, the same configuration as that of the ASC circuit 74a of the second embodiment. In this case, the Δaf detector 100a and so on in the ASC circuit 74b performs the processing using the sound effect frequency fasc, instead of the engine rotational frequency fe.

Alternatively, the ASC circuit 74b may identify the driving state of the vehicle 10B on the basis of a driving state signal Sd from the driving ECU 170 (selection of the driving source) and may perform the processing corresponding to the driving state.

Specifically, when only the motor 12 is selected as the driving source of the vehicle 10B, the ASC circuit 74b selects and uses the ASC circuit 74, which is the same as that in the first embodiment. In this case, the Δafv detector 100 and so on in the ASC circuit 74 performs the processing using the sound effect frequency fasc, instead of the virtual frequency fev.

When the combination of the motor 12 and the engine 150 or only the engine 150 is selected as the driving source of the vehicle 10B, the ASC circuit 74b selects and uses the ASC circuit 74a, which is the same as that in the second embodiment. In this case, the Δaf detector 100a and so on in the ASC circuit 74a performs the processing using the sound effect frequency fasc, instead of the engine rotational frequency fe.

C2. A Variety of Control

C2-1. Selection of Driving Source

In the third embodiment, the driving ECU 170 selects the driving source on the basis of, for example, the accelerator opening degree θap. For example, if the accelerator opening degree θap is lower than or equal to a threshold value THθap1 (hereinafter also referred to as a "low-load determination threshold value THθap1" or a "first opening degree threshold value THθap1") used for determining a low load state, the driving ECU 170 selects only the motor 12 as the driving source.

If the accelerator opening degree θap is lower than or equal to a threshold value THθap2 (hereinafter also referred to as a "middle-load determination threshold value THθap2" or a "second opening degree threshold value THθap2") which is higher than the first opening degree threshold value THθap1 and which is used for determining a middle load state, the driving ECU 170 selects only the engine 150 as the driving source. In this case, power generation in the motor 12 may be performed using the driving force of the engine 150. If the accelerator opening degree θap is higher than the threshold value THθap2, the driving ECU 170 selects the motor 12 and the engine 150 as the driving sources.

The threshold values THθap1 and THθap2 may be varied in accordance with the vehicle speed V. The driving ECU 170 may select the driving source using an index (for example, the vehicle speed V) other than the accelerator opening degree θap.

C2-2. Selection Between ANC Process and ASC Process

In the third embodiment, selection between the ANC process (the ANC apparatus 80a) and the ASC process (the ASC apparatus 82b) is performed, for example, in the following manner. Specifically, a selector switch (not illustrated) used for switching between the ANC process and the ASC process is provided. The acoustic control ECU 40b performs the switching between the ANC process and the ASC process in accordance with the selection state of the selector switch.

Alternatively, the driving ECU 170 may perform the switching between the ANC process and the ASC process in accordance with an acceleration-deceleration state of the vehicle 10B. Specifically, the driving ECU 170 may select the ASC process when the vehicle 10B is in an acceleration state and may select the ANC process when the vehicle 10B is in a constant-speed running state or in a deceleration state. The acceleration-deceleration state of the vehicle 10B may be determined, for example, on the basis of a time differential value of the vehicle speed V. Alternatively, the acceleration-deceleration state of the vehicle 10B may be determined on the basis of the accelerator opening degree θap itself or a time differential value or a second order differential value of the accelerator opening degree θap. When a value concerning the accelerator opening degree θap is used, the switching between the ANC process and the ASC process may be performed on the basis of the intent of the driver 302 for the acceleration-deceleration.

C2-3. Processing by Arbitrator 180

As described above, the arbitrator 180 generates the sound effect frequency fasc on the basis of the virtual frequency fev from the fev setter 70 and the engine rotational frequency fe from the fe detector 160 and supplies the sound effect frequency fasc to the ASC circuit 74b. For example, the arbitrator 180 calculates the average of the virtual frequency fev and the engine rotational frequency fe and uses the average as the sound effect frequency fasc.

Alternatively, the arbitrator 180 may identify the driving state of the vehicle 10B on the basis of the driving state signal Sd from the driving ECU 170 (selection of the driving source) and may perform the processing corresponding to the driving state.

Specifically, the arbitrator 180 outputs the virtual engine rotational frequency fev as the sound effect frequency fasc when only the motor 12 is selected as the driving source of the vehicle 10B. The arbitrator 180 outputs the engine rotational frequency fe as the sound effect frequency fasc when only the engine 150 is selected as the driving source of the vehicle 10B.

When both the motor 12 and the engine 150 are selected as the driving sources of the vehicle 10B, the arbitrator 180 performs weighting to the virtual frequency fev and the engine rotational frequency fe to calculate the sound effect frequency fasc. In the weighting here, the ratio between a target torque of the motor 12 and a target torque of the engine 150 may be used as the ratio between the virtual frequency fev and the engine rotational frequency fe. The target torque may be acquired from, for example, the driving ECU 170.

C3. Advantages in Third Embodiment

The ASC apparatus 82b according to the third embodiment has the following advantages, in addition to or instead of the advantages in the first embodiment or the second embodiment.

According to the third embodiment, it is possible to appropriately output the sound effect even if the operation state of the driving sources (the motor 12 and the engine 150) is varied in the vehicle 10B, which is a hybrid vehicle.

D. Modifications

While the embodiments of the present disclosure have been described above, it will be recognized and understood that various modifications can be made in the present disclosure on the basis of the content of description in this specification. For example, the following configurations may be adopted.

D1. Movable Object

Although the vehicles 10, 10A, and 10B are exemplified as the targets to which the ASC apparatuses 82, 82a, and 82b are applied in the above embodiments, the targets to which the ASC apparatuses 82, 82a, and 82b are applied are not limited to the above ones, for example, from the viewpoint of the generation of the sound effect corresponding to the operation of the driving source or the vibration source. For example, the present disclosure may be applied to a movable object, such as a helicopter, an airplane, or a pleasure boat.

D2. Virtual Engine Rotational Frequency Setter 70

The frequency, which is the fundamental frequency, is set in advance in accordance with the vehicle speed V in the fev setter 70 in the first embodiment and the third embodiment. However, how to set the frequency is not limited to the above one, for example, from the viewpoint of the calculation of the virtual frequency fev on the basis of the vehicle speed V and only one fundamental frequency may be used.

D3. Number of Reference Signals and Components

Although the three reference signals Sr1, Sr2, and Sr3 are used in the above embodiments (refer to FIG. 2 and FIG. 4), the number of the reference signals may be arbitrarily set depending on the specifications of the ASC apparatus. The numbers of the other components (the harmonic multipliers, the reference signal generators, and so on) are varied with the number of the required reference signals.

Although the numbers of the components including the harmonic multipliers 84a, 84b, and 84c and the reference signal generators 86a, 86b, and 86c are set to three, which is equal to the number of the reference signals Sr1, Sr2, and Sr3 (FIG. 1), in the above embodiments, the numbers of the components may be set to one or two for the processing.

D4. Total-Sound-Volume Correctors 102 and 102a

The total-sound-volume corrector 102 in the first embodiment and the third embodiment includes the first gain setter 110, the second gain setter 112, and the third gain setter 114 for the calculation of the common correction gain Gcom (refer to FIG. 2 and FIG. 8). However, any of the gain setters may not be provided, for example, from the viewpoint of the calculation of the common correction gain Gcom.

Similarly, the total-sound-volume corrector 102a in the second embodiment and the third embodiment includes the first gain setter 110a, the second gain setter 112a, the third gain setter 114, and the fourth gain setter 162 for the calculation of the common correction gain Gcom (refer to FIG. 4 and FIG. 8). However, any of the gain setters may not be provided, for example, from the viewpoint of the calculation of the common correction gain Gcom.

The third gain setter 114 in the above embodiments uses the accelerator opening degree θap as a value indicating the load of the driving source (the motor 12 and/or the engine 150) (FIG. 2, FIG. 4, and FIG. 8). However, the value indicating the load of the driving source (the motor 12 and/or the engine 150) is not limited to the accelerator opening degree θap as long as the value indicates the load of the driving source. For example, the vehicles 10 and 10B including the motor 12 may use the torque of the motor 12 or input current into the motor 12 as the load of the driving source (the motor 12). The vehicles 10A and 10B including the engine 150 may use a throttle position, the torque of the engine 150, or a negative pressure in an intake manifold as the load of the driving source (the engine 150).

The amplitudes of the reference signals Sr1, Sr2, and Sr3 (the amplitude of the control signal Sc1) are adjusted using the common correction gain Gcom in the above embodiments. However, for example, the common correction gain Gcom is not limitedly used from the viewpoint of the adjustment of the amplitudes of the reference signals Sr1, Sr2, and Sr3. For example, the amplitudes of the reference signals Sr1, Sr2, and Sr3 may be separately adjusted.

Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. An active sound effect generating apparatus comprising:
   a waveform data table that stores a waveform data corresponding to one waveform period;
   a vehicle speed detecting unit that detects a vehicle speed;

a frequency setting unit that sets a vehicle-speed-corresponding frequency, which is a frequency defined on the basis of the vehicle speed detected by the vehicle speed detecting unit;

a reference signal generating unit that generates a reference signal having a harmonic in accordance with the vehicle-speed-corresponding frequency by sequentially reading the waveform data from the waveform data table;

a control signal generating unit that generates a control signal used for generation of a sound effect on the basis of the reference signal;

an output unit that outputs the control signal as the sound effect;

an amount-of-change-in-frequency calculating unit that calculates an amount of change in frequency, which is a time differential value of the vehicle-speed-corresponding frequency; and a driving source load detecting unit that detects a load of a driving source of a vehicle, wherein the control signal generating unit adjusts an amplitude of the control signal by varying an amplitude of the reference signal in accordance with the amount of change in frequency and the load of the driving source.

2. The active sound effect generating apparatus according to claim 1,
wherein a frequency, which is a fundamental frequency, is set in advance in accordance with the vehicle speed in the frequency setting unit.

3. The active sound effect generating apparatus according to claim 1,
wherein the vehicle is a hybrid vehicle including an engine and a motor as the driving source,
wherein the active sound effect generating apparatus further includes
a rotational frequency detecting unit that detects a rotational frequency of the engine; and
an amount-of-change-in-rotational frequency calculating unit that calculates an amount of change in the rotational frequency of the engine, which is a time differential value of the rotational frequency,
wherein the driving source load detecting unit detects a load of the engine,
wherein the reference signal generating unit generates the reference signal on the basis of the rotational frequency of the engine when only the engine is in a driving state, and
wherein the reference signal generating unit generates the reference signal on the basis of an arbitration frequency resulting from arbitration or selection of the vehicle-speed-corresponding frequency and the rotational frequency of the engine when both the engine and the motor are in the driving state.

4. The active sound effect generating apparatus according to claim 3, wherein the reference signal generating unit generates the reference signal only using the rotational frequency of the engine when only the engine is in the driving state.

5. The active sound effect generating apparatus according to claim 3, wherein the reference signal generating unit calculates the arbitration frequency by performing weighting to the vehicle-speed-corresponding frequency and the rotational frequency of the engine.

6. The active sound effect generating apparatus according to claim 1, further comprising a memory device storing the waveform data table.

7. The active sound effect generating apparatus according to claim 1, wherein the waveform data table comprises instantaneous value data stored as the waveform data, the instantaneous value data representing a predetermined number (N) of instantaneous values into which the waveform of a sine wave in one cyclic period is divided at equal intervals along a time axis.

8. The active sound effect generating apparatus according to claim 1, wherein the frequency setting unit sets the vehicle-speed-corresponding frequency as a virtual engine rotational frequency corresponding to the vehicle speed detected by the vehicle speed detecting unit.

9. A vehicle comprising the active sound effect according apparatus according to claim 1.

10. An active sound effect generating apparatus comprising:
a waveform data table that stores a waveform data corresponding to one waveform period;
a rotational frequency detecting unit that detects a rotational frequency of an engine;
a reference signal generating unit that generates a reference signal having a harmonic in accordance with the rotational frequency by sequentially reading the waveform data from the waveform data table;
a control signal generating unit that generates a control signal used for generation of a sound effect on the basis of the reference signal;
an output unit that outputs the control signal as the sound effect;
an amount-of-change-in-rotational-frequency calculating unit that calculates an amount of change in the rotational frequency of the engine, which is a time differential value of the rotational frequency;
an engine load detecting unit that detects a load of the engine; and
a vehicle speed detecting unit that detects a vehicle speed,
wherein the control signal generating unit adjusts an amplitude of the control signal by varying an amplitude of the reference signal in accordance with the amount of change in rotational frequency, the load of the engine, and the vehicle speed such that the amplitude of the control signal is set so as to be decreased with the decreasing vehicle speed detected by the vehicle speed detecting unit.

11. The active sound effect generating apparatus according to claim 10, wherein the control signal generating unit decreases the amplitude of the control signal with the decreasing vehicle speed even though the rotational frequency of the engine increases.

12. An active sound effect generating apparatus comprising:
a memory device storing a waveform data table that stores a waveform data corresponding to one waveform period;
a vehicle speed detector that detects a vehicle speed;
a frequency setting circuitry that sets a vehicle-speed-corresponding frequency, which is a frequency corresponding to the vehicle speed detected by the vehicle speed detector;
a reference signal generating circuitry that generates a reference signal having a harmonic in accordance with the vehicle-speed-corresponding frequency by sequentially reading the waveform data from the waveform data table;
a control signal generating circuitry that generates a control signal used for generation of a sound effect using the reference signal;

an output circuitry that outputs the control signal as the sound effect;
an amount-of-change-in-frequency calculating circuitry that calculates an amount of change in frequency, which is a time differential value of the vehicle-speed-corresponding frequency; and
a driving source load detector that detects a load of a driving source of a vehicle,
wherein the control signal generating circuitry adjusts an amplitude of the control signal by varying an amplitude of the reference signal in accordance with the amount of change in frequency and the load of the driving source.

13. The active sound effect generating apparatus according to claim 12,
wherein a frequency, which is a fundamental frequency, is set in advance in accordance with the vehicle speed in the frequency setting circuitry.

14. The active sound effect generating apparatus according to claim 12,
wherein the vehicle is a hybrid vehicle including an engine and a motor as the driving source,
wherein the active sound effect generating apparatus further includes
a rotational frequency detector that detects a rotational frequency of the engine; and
an amount-of-change-in-rotational frequency calculating circuitry that calculates an amount of change in the rotational frequency of the engine, which is a time differential value of the rotational frequency,
wherein the driving source load detector detects a load of the engine,
wherein the reference signal generating circuitry generates the reference signal on the basis of the rotational frequency of the engine when only the engine is in a driving state, and
wherein the reference signal generating circuitry generates the reference signal on the basis of an arbitration frequency resulting from arbitration or selection of the vehicle-speed-corresponding frequency and the rotational frequency of the engine when both the engine and the motor are in the driving state.

15. The active sound effect generating apparatus according to claim 14, wherein the reference signal generating circuitry generates the reference signal only using the rotational frequency of the engine when only the engine is in the driving state.

16. The active sound effect generating apparatus according to claim 14, wherein the reference signal generating circuitry calculates the arbitration frequency by performing weighting to the vehicle-speed-corresponding frequency and the rotational frequency of the engine.

17. The active sound effect generating apparatus according to claim 12, wherein the waveform data table comprises instantaneous value data stored as the waveform data, the instantaneous value data representing a predetermined number (N) of instantaneous values into which the waveform of a sine wave in one cyclic period is divided at equal intervals along a time axis.

18. The active sound effect generating apparatus according to claim 12, wherein the frequency setting circuitry sets the vehicle-speed-corresponding frequency as a virtual engine rotational frequency corresponding to the vehicle speed detected by the vehicle speed detector.

* * * * *